Nov. 20, 1945.  A. Y. DODGE  2,389,186
TRANSMISSION
Filed May 14, 1942
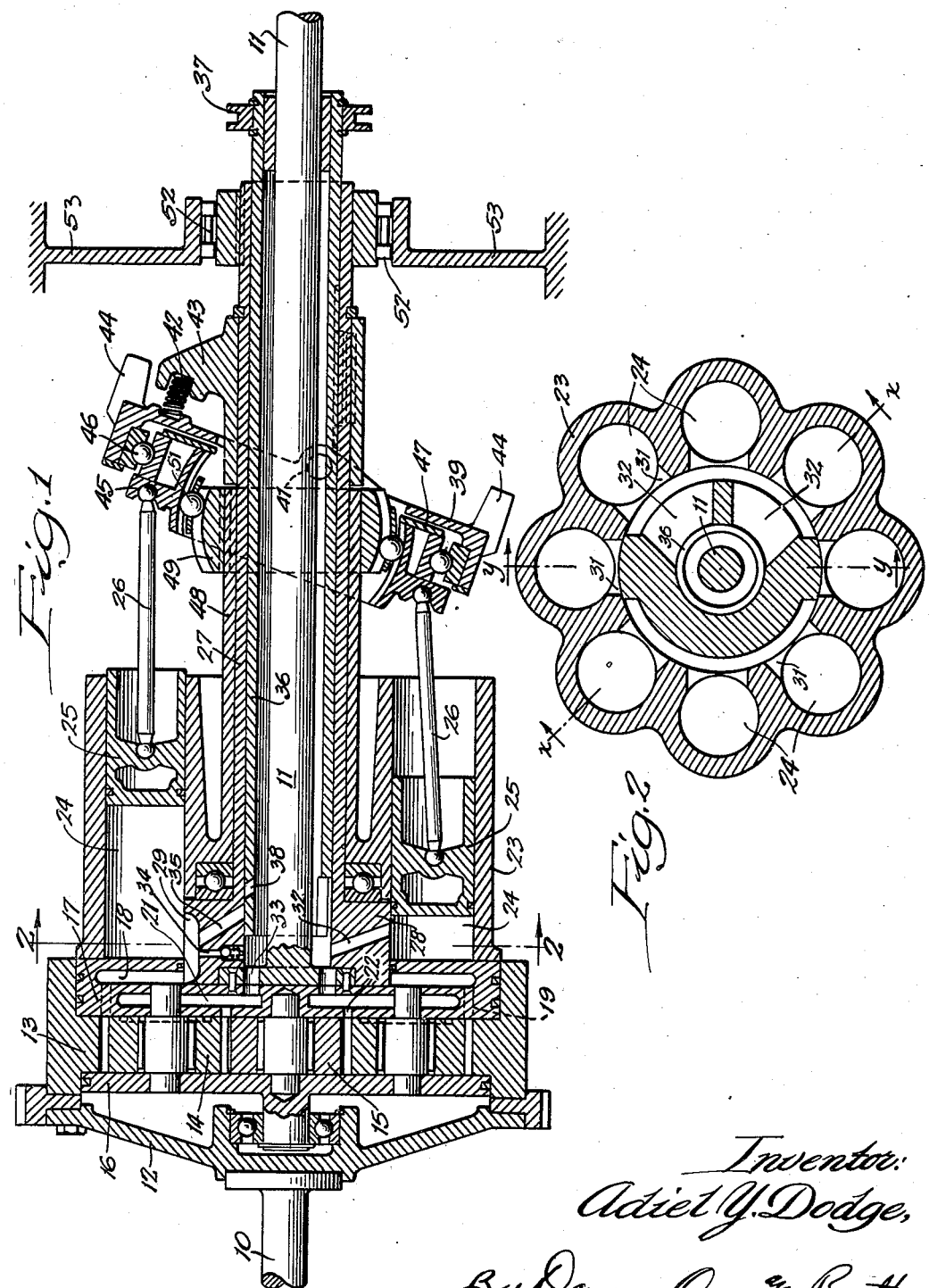
Inventor:
Adiel Y. Dodge,
By Dawson Ooms & Booth
Attorneys.

Patented Nov. 20, 1945

2,389,186

UNITED STATES PATENT OFFICE 2,389,186

TRANSMISSION

Adiel Y. Dodge, Rockford, Ill.

Application May 14, 1942, Serial No. 442,955

10 Claims. (Cl. 60—53)

This invention relates to transmissions and more particularly to transmissions of the fluid displacement type.

One of the objects of the invention is to provide a transmission of the fluid displacement type in which a portion of the input torque is transmitted directly through a fluid pump to the output shaft and fluid from the pump operates a motor whose output torque is also transmitted to the shaft. In this way the motor transmits only the reaction torque of the pump rather than the full torque load and consequently a smaller motor may be utilized.

Another object of the invention is to provide a transmission of the fluid displacement type which is fully automatic in operation. According to one feature the transmission is primarily torque responsive although it may be additionally more or less responsive to speed.

Another object of the invention is to provide a transmission of the fluid displacement type in which the torque flow may be interrupted by venting the motor. Thus, the transmission embodies the functions of a clutch with the addition only of a simple control valve.

Another object of the invention is to provide a transmission of the fluid displacement type in which all of the parts rotate as a unit at a torque and speed ratio of one to one. To accomplish this feature the reaction is taken by a one-way brake during torque multiplication, the brake overrunning as the ratios approach unity.

Still another object of the invention is to provide a transmission of the swash plate type in which the swash plate is eccentrically mounted to be torque responsive and including a ring rotatable and slidable on the swash plate and connected through a universal point to the output shaft.

A further object of the invention is to provide a transmission including a gear pump and a swash plate type motor in which the motor carries only the reaction torque that is, that part of the output torque over and above the input torque.

The above and other objects and advantages of the invention will be apparent from the following description when read in connection with the accompanying drawing, in which—

Figure 1 is a longitudinal section with the motor and valve parts on the line $xx$ of Figure 2 and the swash plate parts on the line $yy$ of Figure 2; and Figure 2 is a transverse section on the line 2—2 of Figure 1.

The transmission illustrated connects a driving shaft 10 to a driven shaft 11 and is of a type adapted for use in automotive vehicles. The driving shaft 10 is connected through a disc 12 to a ring gear 13 meshing with a set of planet pinions 14 which in turn mesh with a sun gear 15. The planet pinions are carried between plates 16 and 17 which fit closely against the sides of the several gears to seal the ends of the teeth against leakage of fluid and which are connected as shown to the driven shaft. The spaces between the plates around the gears may be filled by stop plugs to provide a gear pump as is well understood in the art. The end plate 17 is formed with a high pressure chamber 18 communicating with the gear teeth through pump outlet passages 19 and with a low pressure pump inlet chamber 21 communicating with the opposite side of the planet pinion teeth through passages 22. The sun gear 15, as shown, is freely journalled between the plates 16 and 17 for free rotation. The unit as so far described is substantially similar to that more particularly disclosed and claimed in my copending application, Serial No. 420,479 filed November 26, 1941, now Patent No. 2,371,227.

A motor body 23 is connected to the end plate 17 of the gear pump which is in turn connected to the driven shaft 11 and is formed with a plurality of cylindrical bores 24 in annular array around the driven shaft 11 and parallel thereto. Pistons 25 are slidable in the bores and have connecting rods 26 connected thereto through ball and socket joints.

A sleeve 27 lies within the motor body coaxial with the driven shaft and terminates in a valve plug 28 adjacent the end plate 17. The chamber 18 is adapted to communicate with the cylinders through a motor inlet groove 29 extending substantially half way around the valve body and establishing communication between the chamber 18 and the cylinders through motor inlet ports in the cylinder side walls adjacent the end thereof. As shown, the motor inlet ports 31 may be made substantially the full width of the cylinders to provide unrestricted communication between passage 18 and the cylinders. Fluid is adapted to be exhausted from the cylinder through motor exhaust passages 32 in the valve body 28, the exhaust passages extending throughout substantially the other half of the valve body. The motor exhaust passages 32 communicate freely with the pump intake passage 21 of the pump through ports 33 extending through the end walls 17 and through a mating flange on the driven shaft 11 by means of which the driven shaft is connected to the gear carrier.

To prevent damage in the event of overloading, a relief port 34 may be provided in the valve body 28 controlled by a pressure responsive valve to establish communication between the motor inlet port 29 and the pump inlet passage 21. In order that the transmission may be thrown out of operation to interrupt the torque between driving and driven shafts a by-pass 35 is provided extending between the motor inlet passage 29 and the interior of the sleeve 27. The passage 35 is normally closed by a tubular valve 36 fitting closely within the sleeve 27 and overlying the by-pass 35. If it is desired to interrupt the torque flow the tube may be shifted to the left through a collar 37 to bring a port 38 in the tube into register with the by-pass 35. At this time the motor inlet passage is vented directly to the interior of the sleeve so that no pressure will be built up in the cylinders or in the pump.

The sleeve 27 carries a swash plate 39 pivoted thereto about an axis 41 transverse to the driven shaft 11 and displaced from the axis thereof. The swash plate is urged to a radial position by a spring 42 acting between the swash plate and an abutment 43 and is adapted to yield in response to pressure thereon. If desired, one or more weights 44 may be connected to the swash plate so that it will tend to move into a radial position in response to centrifugal force.

A ring 45 is rotatably and slidably carried by the swash plate through bearings 46 slidable between the back surface of the ring and a flange plate 47 thereon. Through the bearings 46 the ring may rotate freely on the swash plate and may slide over the interior bearing ring to move radially relative to the swash plate. The ring 45 is connected to the opposite ends of the piston rods 26 through ball and socket joints and is adapted to be connected to the motor body to transmit torque thereto. For this purpose the motor body is formed with a tubular extension 48 rotatably surrounding the sleeve 27 and carrying at its outer end a partially cylindrical hub 49. The cylindrical surfaces of the hub 49 are concentric with the ring 45 and are connected thereto by balls 51 riding in registering grooves in adjacent surfaces. This construction provides a constant velocity universal joint which may be of the type more particularly described and claimed in my copending application, Serial No. 424,390, filed December 26, 1941, now Patent No. 2,322,570. It will be noted that with this construction the ring 45 swings about a center intersecting the axis of the driven shaft while the swash plate 39 swings about the center 41 so that as the angle of the swash plate is changed the ring will have a sliding movement relative thereto.

The sleeve 27 is adapted to form the reaction or fulcrum member for the transmission and for this purpose it may be held against reverse rotation by a combined bearing and one-way brake 52 acting between the sleeve and a fixed housing part 53. The bearing 52 is not shown in detail but it may be of the type disclosed and claimed in my Patent No. 2,113,722.

In operation the driving shaft 10 turns the ring gear 13 and if the gear carrier formed by the plates 16 and 17 is held against rotation or is caused to rotate slower than the driving shaft by resistance on the driven shaft, the gears 13, 14 and 15 will turn relative to each other. This tends to turn the driven shaft through the carrier and will cause liquid such as oil to be pumped from the pump inlet passage 21 into the chamber 18 and the oil will flow through the motor inlet port 29 into all of the cylinders lying on the left side of the transmission as seen in Figure 2. This will cause a thrust on the connecting rods 26 of these cylinders tending to tilt the swash plate 39 about its pivot and to move the ring 45 in a forward direction due to the camming action of the swash plate. The reaction on the swash plate tending to turn it rearwardly will be taken through the one-way brake 52 and forward torque on the ring will be transmitted to the motor body through sleeve 48 and to the driven shaft through the motor housing and the pump wall 17. Thus the torque on the driven shaft will be the sum of the torque drag in the gear pump and the torque transmitted from the ring 45, while the swash plate will be required to absorb only the reaction torque equal to the forward torque developed by the ring 45. As the driven shaft turns, the cylinders communicating with the motor inlet passage 29 will move around into communication with the motor outlet ports 32 and liquid therein will flow back into the inlet passage 21 of the pump. During this operation the parts 12 and 13 turn with the driving shaft 10, the parts 16, 17, 23, 45, 48 and 49 turn with the driven shaft 11, and parts 27 and 28 are either held stationary by the one way brake or turn forward when the brake overruns.

As the required output torque decreases, the load on spring 42 decreases, the compression therein moves swash plate 39 to an angle more normal to the shaft 11. This reduces the stroke of the fluid motor, therefore, reduces its volumetric capacity, causing the motor to turn faster for a given volume being pumped. The volume pumped by the gear pump also decreases per revolution of the driving shaft 10 as the output shaft turns faster but not until the speed of the output shaft has been increased.

If the torque on the driven shaft becomes equal to that of the driving shaft the swash plate will assume a radial position at right angles to the driven shaft so that the pistons 25 will not be moved as the motor body rotates. At this time, the pump operates as a lock unit transmitting torque between the driving and driven shafts at a one to one ratio. Also, since there is no reaction to be absorbed by the one-way brake 52 it will tend to overrun allowing the sleeve 27 and the valve body 28 to turn with the motor body. Thus, at this time all parts turn as a unit.

If it is desired to disconnect the driving and driven shafts the tube 36 may be shifted to the left to open the by-pass 35. With the driving shaft turning fluid will be pumped freely from the pump outlet passage 18 through the port 29, by-pass 35, ports 33, and back to the inlet passage 21 of the pump. Thus no torque will be transmitted and the valve 36 performs all of the functions of the usual clutch.

Performance of one unit embodying the invention is indicated by the following chart, assuming an engine R. P. M. of 100, an engine torque of 100 and a pump designed to deliver 10 cubic inches per differential revolution:

| #1 torque ratio | #2 R. P. M. of driven shaft | #3 difference between speeds of pump input and output members | #4 torque required of the motor which is also reaction | #5 #3 — #2 | #6 #5×10 required vol. per rev. of motor |
|---|---|---|---|---|---|
| 6:1 | 16.6 | 83.3 | 500 | 5 | 50 |
| 5:1 | 20 | 80 | 400 | 4 | 40 |
| 4:1 | 25 | 75 | 300 | 3 | 30 |
| 3:1 | 33.3 | 66.6 | 200 | 2 | 20 |
| 2:1 | 50 | 50 | 100 | 1 | 10 |
| 1.5:1 | 66.6 | 33.3 | 50 | ½ | 5 |
| 1:1 | 100 | 0 | 0 | 0 | 0 |

While one embodiment of the invention has been shown and described in detail, it will be understood that this embodiment is illustrative only and is not intended as a definition of the scope of the invention, reference being had for this purpose to the appended claims.

What is claimed is:

1. A transmission for connecting a driving shaft to a driven shaft comprising a fluid pump having two relatively rotatable elements, one of which is connected to the driving shaft to be driven thereby and the other of which is connected to the driven shaft, a motor body connected to the driven shaft and having a plurality of cylinders therein parallel to the driven shaft, pistons in the cylinders, a sleeve rotatably mounted around the driven shaft, valve means carried by the sleeve to control the inlet of fluid from the pump to the motor and the exhaust of fluid from the motor, a swash plate pivoted to the sleeve, a ring rotatably carried by the swash plate and connected to the pistons to take the thrust thereof, and a one-way brake to hold the sleeve against reverse rotation.

2. A transmission for connecting a driving shaft to a driven shaft comprising a fluid pump having one element connected to the driving shaft and a second element connected to the driven shaft to exert a torque thereon proportional to fluid resistance in the pump, a motor body connected to said second element and having a plurality of cylinders therein parallel to the driven shaft, pistons in the cylinders, a swash plate rotatably mounted around the driven shaft, means pivotally mounting the swash plate on an axis transverse to the driven shaft and displaced from the driven shaft axis, yielding means urging the swash plate to a position at a right angle to the driven shaft, a ring rotatably and slidably carried by the swash plate and connected to the pistons to take the thrust thereof, a universal joint coaxial with the driven shaft connecting the ring to the motor body, and means to hold the swash plate against reverse rotation.

3. A transmission for connecting driving and driven shafts comprising a planetary gear set having a cage for the planet gears, means encasing the gears of the set to form a plurality of fluid pumps connected in multiple, means connecting the ring gear of the gear set to the driving shaft, means connecting the planet cage to the driven shaft to transmit a portion of the driving torque directly to the driven shaft, a fluid motor body connected to said cage and having a plurality of cylinders therein, pistons in the cylinders, a sleeve coaxial with the driven shaft and rotatable relative to the motor body, the sleeve being formed with valve means to control flow of fluid between the pumps and the motor, a swash plate pivotally connected with the sleeve, means to control the angular position of the swash plate, means connecting the pistons to the swash plate, a fixed member, and means connecting the swash plate and fixed member to prevent rotation of the swash plate.

4. A transmission for connecting driving and driven shafts comprising a planetary gear set having a cage for the planet gears, means encasing the gears of the set to form a plurality of fluid pumps connected in multiple, means connecting the ring gear of the gear set to the driving shaft, means connecting the planet cage to the driven shaft to transmit a portion of the driving torque directly to the driven shaft, a fluid motor body connected to said cage and having a plurality of cylinders therein, pistons in the cylinders, valve means to control the flow of fluid between the pumps and the motor, a swash plate, means supporting the swash plate for pivotal movement, means to control the angular position of the swash plate about its pivot, means connecting the pistons to the swash plate, a fixed member, and means connecting the swash plate to the fixed member to prevent rotation thereof.

5. A transmission for connecting driving and driven shafts comprising a planetary gear set, means encasing the gears of the set to form a fluid pump, means connecting one element of the gear set to the driving shaft and another element to the driven shaft, a fluid motor body connected to said other element of the gear set and having a plurality of cylinders therein parallel to the driven shaft, pistons in the cylinders, a sleeve coaxial with the driven shaft and rotatable relative to the motor body, the sleeve being formed with valve means to control flow of fluid between the pump and the motor, a swash plate pivoted on the sleeve, means to control the angular position of the swash plate, a ring rotatably carried by the swash plate and connected to the pistons, a universal joint connecting the ring to the motor body, and a one-way brake to hold the sleeve against reverse rotation.

6. A transmission for connecting driving and driven shafts comprising a planetary gear set, means encasing the gears of the set to form a fluid pump, means connecting one element of the gear set to the driving shaft and another element to the driven shaft, a fluid motor body connected to said other element of the gear set and having a plurality of cylinders therein parallel to the driven shaft, pistons in the cylinders, a sleeve coaxial with the driven shaft and rotatable relative to the motor body, the sleeve being formed with valve means to control flow of fluid between the pump and the motor, a swash plate pivoted on the sleeve, means to control the angular position of the swash plate, a ring rotatably carried by the swash plate and connected to the pistons, a universal joint connecting the ring to the motor body, a one-way brake to hold the sleeve against reverse rotation, the sleeve being formed with a by-pass from the inlet to the exhaust side of the motor, and a valve member slidable longitudinally of the sleeve to control the by-pass.

7. A transmission for connecting driving and driven shafts comprising a planetary gear set, means encasing the gears of the set to form a fluid pump, means connecting one element of the gear set to the driving shaft and another element to the driven shaft, a fluid motor body connected to said other element of the gear set and having a plurality of cylinders therein parallel to the driven shaft, pistons in the cylinders, a sleeve coaxial with the driven shaft and rotatable relative to the motor body, the sleeve being formed with valve means to control flow of fluid between the pump and the motor, a swash plate pivoted on the sleeve on an axis transverse thereto and displaced from the axis thereof, resilient means urging the swash plate to a position at a right angle to the sleeve, a ring rotatably and slidably carried by the swash plate and connected to the pistons, a universal joint coaxial with the sleeve connecting the ring to the motor body, and a one-way brake to hold the sleeve against reverse rotation.

8. In a fluid transmission, a fluid motor comprising a motor body having a plurality of cylinders in annular array around a shaft, pistons in the cylinders, a swash plate mounted for pivotal movement about an axis transverse to and displaced from the axis of the shaft, yielding means urging the swash plate to a position at right angles to the shaft, a ring rotatably and slidably carried by the swash plate, connecting rods jointed at their opposite ends to the pistons and the ring, and a universal joint coaxial with the shaft connecting the ring to the motor body.

9. In a fluid transmission, a fluid motor comprising a motor body having a plurality of cylinders in annular array around a shaft, pistons in the cylinders, a swash plate mounted for pivotal movement about an axis transverse to and displaced from the axis of the shaft, yielding means urging the swash plate to a position at right angles to the shaft, a ring rotatably and slidably carried by the swash plate, connecting rods jointed at their opposite ends to the pistons and the ring, a tubular extension on the motor body coaxial with the shaft and extending into the ring, and a universal joint concentric with the ring connecting the ring to said extension.

10. In a fluid transmission, a body formed with a plurality of cylinders in annular array around an axis, a valve sleeve coaxial with the axis and formed with peripheral inlet and exhaust passages, the exhaust passages communicating with the central portion of the sleeve the cylinders having ports in their side walls to register with said passages, means to produce relative rotation between the body and the sleeve, the sleeve being formed with a by-pass from its inlet passage to its central portion, and a tube slidable in the sleeve to open and close the by-pass.

ADIEL Y. DODGE.